(12) United States Patent
Kakulamarri et al.

(10) Patent No.: US 10,747,495 B1
(45) Date of Patent: Aug. 18, 2020

(54) DEVICE AGGREGATION REPRESENTING MULTIPLE ENDPOINTS AS ONE

(71) Applicant: Microsoft Technology Licensing, LLC, Redmond, WA (US)

(72) Inventors: Laxmi Narsimha Rao Kakulamarri, Redmond, WA (US); Edward Sumanaseni, Sammamish, WA (US); Egidio Sburlino, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/428,299

(22) Filed: May 31, 2019

(51) Int. Cl.
*G06F 3/16* (2006.01)
*H04R 3/12* (2006.01)

(52) U.S. Cl.
CPC ............... *G06F 3/165* (2013.01); *H04R 3/12* (2013.01); *H04R 2499/15* (2013.01)

(58) Field of Classification Search
CPC ........ G06F 3/165; H04R 3/12; H04R 2499/15
See application file for complete search history.

(56) References Cited

U.S. PATENT DOCUMENTS

| | | | |
|---|---|---|---|
| 6,963,353 B1 * | 11/2005 | Firestone | ............... H04N 7/147 348/14.08 |
| 7,577,757 B2 | 8/2009 | Carter et al. | |
| 7,953,118 B2 | 5/2011 | Krantz et al. | |
| 8,234,395 B2 | 7/2012 | Millington | |
| 8,316,147 B2 | 11/2012 | Batson et al. | |
| 8,681,822 B2 * | 3/2014 | Bradley | ............ H04L 29/06027 370/503 |
| 9,319,792 B1 * | 4/2016 | Coleman | .................. H04R 3/12 |
| 2009/0037959 A1 * | 2/2009 | Suh | ..................... H04N 21/4345 725/62 |

(Continued)

FOREIGN PATENT DOCUMENTS

WO 2018152242 A1 8/2018

OTHER PUBLICATIONS

David, "Play Same Song on Multiple Phones Simultaneously", Retrieved from https://7labs.io/mobile/music-in-sync-on-multiple-devices.html, Apr. 15, 2019, 11 Pages.

(Continued)

*Primary Examiner* — David L Ton
(74) *Attorney, Agent, or Firm* — Ray Quinney & Nebeker; Tiffany Healy

(57) ABSTRACT

Methods and devices for aggregating a plurality of display devices in communication with a computer device and representing the display devices as a single audio endpoint may include receiving audio data from an application. The methods and devices may include combining the audio data for the plurality of display devices in communication with the computer device into an audio buffer with a size determined by a total number of audio channels of the plurality of display devices. The methods and devices may include partitioning the audio buffer into sections and identifying a subset of the sections of the audio buffer that correspond to each of the plurality of display devices. The methods and devices may include transmitting the subset of the sections of the audio buffer that correspond to each of the plurality of display devices.

20 Claims, 6 Drawing Sheets

(56) References Cited

U.S. PATENT DOCUMENTS

| | | |
|---|---|---|
| 2010/0042238 A1 | 2/2010 | Moore et al. |
| 2011/0258338 A1* | 10/2011 | Vass ........................ H04N 7/148 709/233 |
| 2018/0233136 A1* | 8/2018 | Torok ........................ H04R 3/12 |
| 2020/0014742 A1* | 1/2020 | Pollet .................... H04L 69/164 |

OTHER PUBLICATIONS

Singh, Laxman, "Speakerblast: Play Same Music on Multiple Devices from Any Location", Retrieved from http://www.ilovefreesoftware.com/03/webware/speakerblast-play-same-music-on-multiple-devices.html, Feb. 3, 2014, 5 Pages.

* cited by examiner

DEVICE AGGREGATION REPRESENTING MULTIPLE ENDPOINTS AS ONE

BACKGROUND

The present disclosure relates to multiple devices in communication with a computer device.

When you have multiple devices connected in a meeting room, each device may have audio and may be used during the meeting to emit audio. Users may have to manage each of the devices individually when setting up the devices in the meeting room and/or coordinating the use of the devices during the meeting. Depending on the number of devices and/or the use of the devices, this may become cumbersome.

Thus, there is a need in the art for improvements in managing multiple devices in communication with a computer device.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

One example implementation relates to a computer device. The computer device may include a memory to store data and instructions, at least one processor configured to communicate with the memory, and an operating system configured to communicate with the memory and the processor, wherein the operating system is operable to: receive audio data from an application; combine the audio data for a plurality of display devices in communication with the computer device into an audio buffer with a size determined by a total number of audio channels of the plurality of display devices; partition the audio buffer into sections, wherein a total number of the sections correspond to the size of the audio buffer; identify a subset of the sections of the audio buffer that correspond to each of the plurality of display devices; and transmit the subset of the sections of the audio buffer that correspond to each of the plurality of display devices.

Another example implementation relates to a method for aggregating a plurality of display devices in communication with a computer device. The method may include receiving, at an operating system executing on the computer device, audio data from an application. The method may include combining the audio data for the plurality of display devices in communication with the computer device into an audio buffer with a size determined by a total number of audio channels of the plurality of display devices. The method may include partitioning the audio buffer into sections, wherein a total number of the sections corresponds to the size of the audio buffer. The method may include identifying a subset of the sections of the audio buffer that correspond to each of the plurality of display devices. The method may include transmitting the subset of the sections of the audio buffer that correspond to each of the plurality of display devices.

Another example implementation relates to computer-readable medium storing instructions executable by a computer device. The computer-readable medium may include at least one instruction for causing the computer device to receive audio data from an application. The computer-readable medium may include at least one instruction for causing the computer device to combine the audio data for a plurality of display devices in communication with the computer device into an audio buffer with a size determined by a total number of audio channels of the plurality of display devices. The computer-readable medium may include at least one instruction for causing the computer device to partition the audio buffer into sections, wherein the total number of the sections correspond to the size of the audio buffer. The computer-readable medium may include at least one instruction for causing the computer device to identify a subset of the sections of the audio buffer that correspond to each of the plurality of display devices. The computer-readable medium may include at least one instruction for causing the computer device to transmit the subset of the sections of the audio buffer that correspond to each of the plurality of display devices.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

Figure 1:
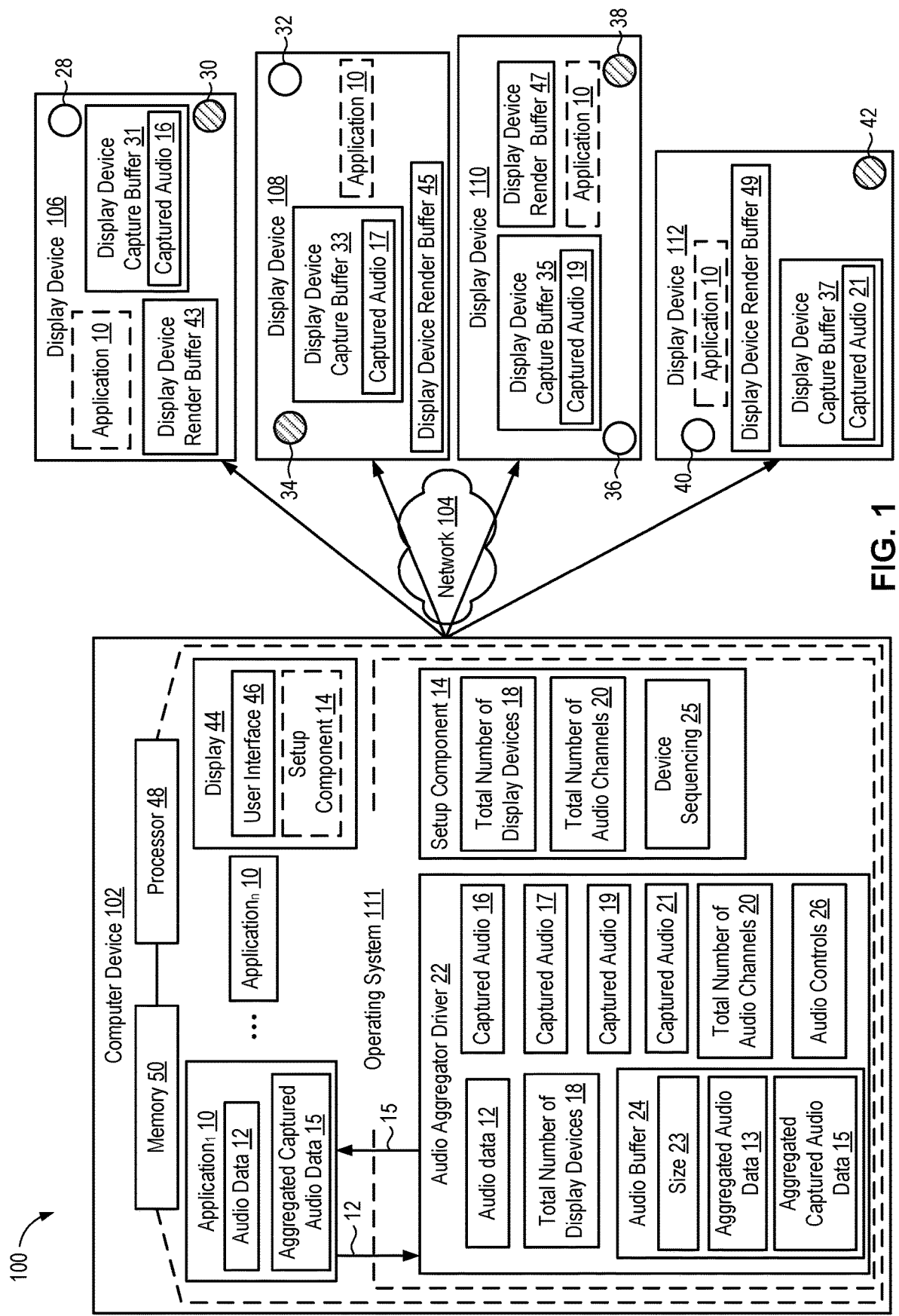
FIG. 1 is a schematic block diagram of an example computer device in communication with a plurality of display devices in accordance with an implementation of the present disclosure.

This disclosure relates to devices and methods for aggregating audio data to send to a plurality of display devices in communication with a computer device and/or aggregating received audio captured from the plurality of display devices. The devices and methods may represent the display devices as a single audio endpoint. For example, the plurality of display devices may communicate with the computer device via a universal serial bus (USB). The devices and methods may include one or more display devices in communication with a computer device. The display devices may have at least one display and a corresponding audio input and/or audio output. The display devices may be any type of display, monitor, visual presentation device, computer device, and/or physical panel capable of presenting information, capturing audio, and/or emitting audio. Each display device may include any number of channels (e.g., speakers and/or microphones) for capturing audio or emitting audio. Each speaker and/or microphone of display devices may correspond to any number of channels. For example, the speakers and/or microphones may be two channel stereo with a left channel and a right channel.

The devices and methods may use an audio aggregator driver that aggregates audio from all display devices into a single audio endpoint. As such, instead of exposing each of the display devices to a user and having a user configure each of the display devices independently, the audio aggregator driver may create an array of speakers from each of the display devices so that the applications and/or system may view all of the display devices as a single stereo device.

In an implementation, the devices and methods may use two layers of drivers, such as the audio aggregator driver on the computer device and a plurality of unit drivers on the computer device. Each unit driver may be associated with one of the plurality of display devices so that each display device may be represented on the computer device through a unit driver. In addition, each unit driver may communicate with a display device capture buffer to collect audio captured by one or more microphones on the display devices and/or a display device render buffer to receive audio to output via speakers on the display devices. Audio may be sent by an application to the audio aggregator driver, and the audio aggregator driver may distribute the audio to each of the display devices through the unit drivers representing each of the display devices.

In addition, the audio aggregator driver may receive any audio captured by the display device capture buffers and may send the captured audio to the applications. For example, a microphone or other capture endpoint on the display device may acquire audio input to the display device, such as, but not limited, a person speaking, any audio near the display device, or music playing by the display device or near the display device. Each display device may have a plurality of channels to emit and/or capture audio and may represent an audio endpoint in the system. On a particular display device, there may be multiple windows and/or virtual panels corresponding to applications.

The methods and devices may use the audio aggregator driver to combine all of the display devices into a single audio endpoint and use the display devices as one audio endpoint. For example, the audio aggregator driver may generate a single audio buffer with the aggregated audio data for all of the display devices. The audio buffer may have a size that corresponds to the total number of channels supported by the plurality of display devices. The audio aggregator driver may identify a subsection of the audio buffer that corresponds to each display device so that audio data may be distributed from the audio buffer to the corresponding display device render buffers. By interleaving all the channels from the plurality of display devices together into a single audio buffer, the plurality of display devices may be represented as a single audio endpoint and may be configured together without having to expose each display device individually to applications and/or users of the computer device. As such, the display devices may be represented to applications as a single endpoint that supports the total number of channels supported by the plurality of display devices.

In addition, the audio aggregator driver may combine the captured audio received from the display device capture buffers into a single audio buffer. The audio aggregator driver may present the received captured audio to the applications for use by the applications.

By aggregating the audio into a single endpoint, the plurality of display devices may be represented as a single audio endpoint and may be configured together without having to expose each display device individually to applications and/or users.

Referring now to FIG. 1, a system 100 for use with aggregating display devices and representing the display devices as a single endpoint may include a computer device 102 in communication with a plurality of display devices 106, 108, 110, 112 via a wired or wireless network 104. In an implementation, display devices 106, 108, 110, 112 may communicate with computer device 102 via USB. The plurality of display devices 106, 108, 110, 112 may be any type of display, monitor, visual presentation device, computer device, and/or physical panel capable of presenting information, capturing audio, and/or emitting audio. In addition, each display device 106, 108, 110, 112, may include any number of channels for capturing audio and/or emitting audio. For example, display device 106 may include a speaker 28 that supports two channels (e.g., right and left) and may include a microphone 30. Display device 108 may include a speaker 32 that supports two channels (e.g., right and left) and may include a microphone 34. Display device 110 may include a speaker 36 that supports two channels (e.g., right and left) and may include a microphone 38. Display device 112 may include a speaker 40 that supports two channels (e.g., right and left) and may include a microphone 42. Each speaker 28, 32, 36, 40 and/or microphone 30, 34, 38, 42 of display devices 106, 108, 110, 112 may correspond to any number of channels.

Each of the plurality of display devices 106, 108, 110, 112 may include an audio buffer per audio device entity used to capture and/or output audio. For example, the plurality of display devices 106, 108, 110, 112 may include individual display device render buffers 43, 45, 47, 49 that may receive audio data 12 to output via speakers 28, 32, 36, and/or 40. The display device render buffers 43, 45, 47, 49 may receive channel-specific audio data 12 corresponding to the particular display device 106, 108, 110, 112.

In addition, the plurality of display devices 106, 108, 110, 112 may include individual display device capture buffers 31, 33, 35, 37 that may receive captured audio 16, 17, 19, 21 by microphones 30, 34, 38, 42. For example, if an individual speaks into one or more microphones 30, 34, 38, 42 on display devices 106, 108, 110, 112, the captured audio 16, 17, 19, 21 received by microphones 30, 34, 38, 42 may be stored in display device capture buffers 31, 33, 35, 37.

The plurality of display devices 106, 108, 110, 112 may be combined together and used as one. For example, one or more applications 10 executing on computer device 102 may be used by any one of display devices 106, 108, 110, 112. Applications 10 may be spread across multiple display devices 106, 108, 110, 112 without being constrained to a single display device 106, 108, 110, 112. On a particular display device 106, 108, 110, 112, there may be multiple windows and/or virtual panels that may correspond to one or more applications 10. For example, applications 10 may have a graphical user interface (UI) that corresponds to a window on a display device 106, 108, 110, 112. As such, a whole new dimension to collaborative and productive work may be created using system 100.

Computer device 102 may include any mobile or fixed computer device, which may be connectable to a network. Computer device 102 may be, for example, a computer device such as a desktop or laptop or tablet computer, an internet of things (IOT) device, a cellular telephone, a gaming device, a mixed reality or virtual reality device, a music device, a television, a navigation system, a camera, a personal digital assistant (PDA), or a handheld device, or any other computer device having wired and/or wireless connection capability with one or more other devices.

Computer device 102 may include an operating system 111 may be executed by processor 48 and/or memory 50. Memory 50 of computer device 102 may be configured for storing data and/or computer-executable instructions defining and/or associated with operating system 111, and processor 48 may execute such data and/or instructions to instantiate operating system 111. An example of memory 50 can include, but is not limited to, a type of memory usable by a computer, such as random access memory (RAM), read only memory (ROM), tapes, magnetic discs, optical discs, volatile memory, non-volatile memory, and any combination thereof. An example of processor 48 can include, but is not limited to, any processor specially programmed as described herein, including a controller, microcontroller, application specific integrated circuit (ASIC), field programmable gate array (FPGA), system on chip (SoC), or other programmable logic or state machine.

Operating system 111 may include a setup component 14 that may initialize and/or configure system 100. For example, setup component 14 may determine a total number of display devices 18 in communication with computer device 102. For example, the total number of display devices 18 may be predetermined by a user of computer device 102 and/or user input may be received via, for example, user interface 46 of display 44 indicating the total number of display devices 18 for system 100. As display devices are added and/or removed from system 100, the total number of display devices 18 may increase and/or decrease as necessary.

Setup component 14 may also determine a total number of audio channels 20 in system 100. Each display device 106, 108, 110, 112 may provide information regarding the number of audio channels supported. For example, setup component 14 may receive hardware information from each of the display devices 106, 108, 110, 112 that identifies how many channels display devices 106, 108, 110, 112 may have, how many channels display devices 106, 108, 110, 112 may support, whether display devices 106, 108, 110, 112 may be a high speed device or super speed device, how many audio rendering endpoints display devices 106, 108, 110, 112 may have, how many capture endpoints display devices 106, 108, 110, 112 may have, and/or any hardware loopback points on display devices 106, 108, 110, 112. Setup component 14 may capture the hardware information of the display devices 106, 108, 110, 112 and may build a topology for system 100 in response to the information learned from the display devices 106, 108, 110, 112.

The total number of audio channels 20 may be calculated by multiplying the total number of display devices 18 by the number of audio channels supported. For example, display device 106 may support two channels (e.g., speaker 28 that supports two channels, right and left); display device 108 may support two channels (e.g., speaker 32 that supports two channels, right and left); display device 110 may support two channels (e.g., speaker 36 that supports two channels, right and left); and display device 112 may support two channels (e.g., speaker 40 that supports two channels, right and left). As such, the total number of audio channels 20 may be eight (e.g., the total number of display device devices multiplied by the number of audio channels supported by each of the display device devices).

In addition, setup component 14 may determine a device sequencing 25 that may apply an order to the display devices 106, 108, 110, 112 so that audio may be routed in response to the device sequencing 25. For example, the order may include display device 106 as a first display device, display device 108 as a second display device, display device 110 as a third display device, and display device 112 as a fourth display device.

The information from setup component 14 may be used by an audio aggregator driver 22 to combine the plurality of display devices 106, 108, 110, 112 and represent the display devices 106, 108, 110, 112 as a single audio endpoint.

Audio aggregator driver 22 may receive audio data 12 from one or more applications 10. Display devices 106, 108, 110, 112 may be represented to application 10 as a single audio endpoint with the total number of audio channels supported 20. As such, application 10 may be unaware of the plurality of display devices 106, 108, 110, 112 in communication with computer device 102. For example, application 10 may provide audio data 12 that corresponds to two channels of data and audio aggregator driver 22 may internally duplicate the audio data 12 into the total number of audio channels supported 20 by display devices 106, 108, 110, 112 (e.g., eight channels). The audio data 12 may also be silenced during the duplication process in response to a determination that one or more display devices 106, 108, 110, 112 may not need to output audio.

Audio aggregator driver 22 may generate a single audio buffer 24 for the audio data 12. The audio buffer 24 may have a size 23 that corresponds to the total number of audio channels 20 supported by system 100. As such, audio buffer 24 may be dynamic based on the parameters of system 100. As the number of display devices 106, 108, 110, 112 increases and/or decreases and/or the total number of audio channels 20 increases and/or decreases, the size 23 of audio buffer 24 may increase and/or decrease.

Audio aggregator driver 22 may also identify a section of audio buffer 24 that corresponds to each display device 106, 108, 110, 112 so that audio data 12 from audio buffer 24 may distributed to the corresponding display device render buffers 43, 45, 47, 49. By interleaving all the channels together into a single audio buffer 24, the plurality of display devices 106, 108, 110, 112 may be represented as a single audio endpoint and may be configured together without having to expose each display device 106, 108, 110, 112 individually to applications 10 and/or users of computer device 102. As such, the display devices 106, 108, 110, 112 may be represented to application 10 as a single audio endpoint that supports eight channels.

Audio aggregator driver 22 may also send audio controls 26 to display devices 106, 108, 110, 112. Audio controls 26 may include, but are not limited to, volume controls. For example, a user may raise or lower the volume on all of the display devices 106, 108, 110, 112 at a single time. Audio aggregator driver 22 may receive a notification that the volume has changed and audio aggregator driver 22 may send audio controls 26 to display devices 106, 108, 110, 112 to modify the volume.

Audio aggregator driver 22 may receive any captured audio 16, 17, 19, 21 from display device capture buffers 31, 33, 35, 37. The captured audio 16, 17, 19, 21 may include the audio from microphones 30, 34, 38, 42 (e.g., an individual speaking) and/or any audio from speakers 28, 32, 36, 40 (e.g., background music). For example, when an individual (who may be in the same room as display devices 106, 108, 110 112) speaks near one or more of microphones 30, 34, 38, 42, the captured audio 16, 17, 19, 21 from microphones 30, 34, 38, 42 may be stored in one or more display device capture buffers 31, 33, 35, 37.

In an implementation, audio aggregator driver 22 may combine the captured audio 16, 17, 19, 21 into audio buffer 24. As discussed above, audio aggregator driver 22 may determine sections of audio buffer 24 that correspond to each display device 106, 108, 110, 112. Audio aggregator driver 22 may combine the captured audio 16, 17, 19, 21 into the sections of audio buffer 24 that correspond to each display device 106, 108, 110, 112 using the device sequencing 25 resulting in aggregated captured audio data 15.

Audio aggregator driver 22 may provide the combined aggregated captured audio data 15 to applications 10. For example, applications 10 may use the captured audio 16, 17, 19, 21 to record the audio outputted from speakers 28, 32, 36, 40 and/or received by microphones 30, 34, 38, 42.

As such, by aggregating the display devices 106, 108, 110, 112 into a single audio endpoint, the plurality of display devices 106, 108, 110, 112 may be represented as a single audio endpoint to application(s) 10 and/or users and may be configured together without having to expose each display device 106, 108, 110, 112 individually to applications 10 and/or users of system 100.

Figure 2A:
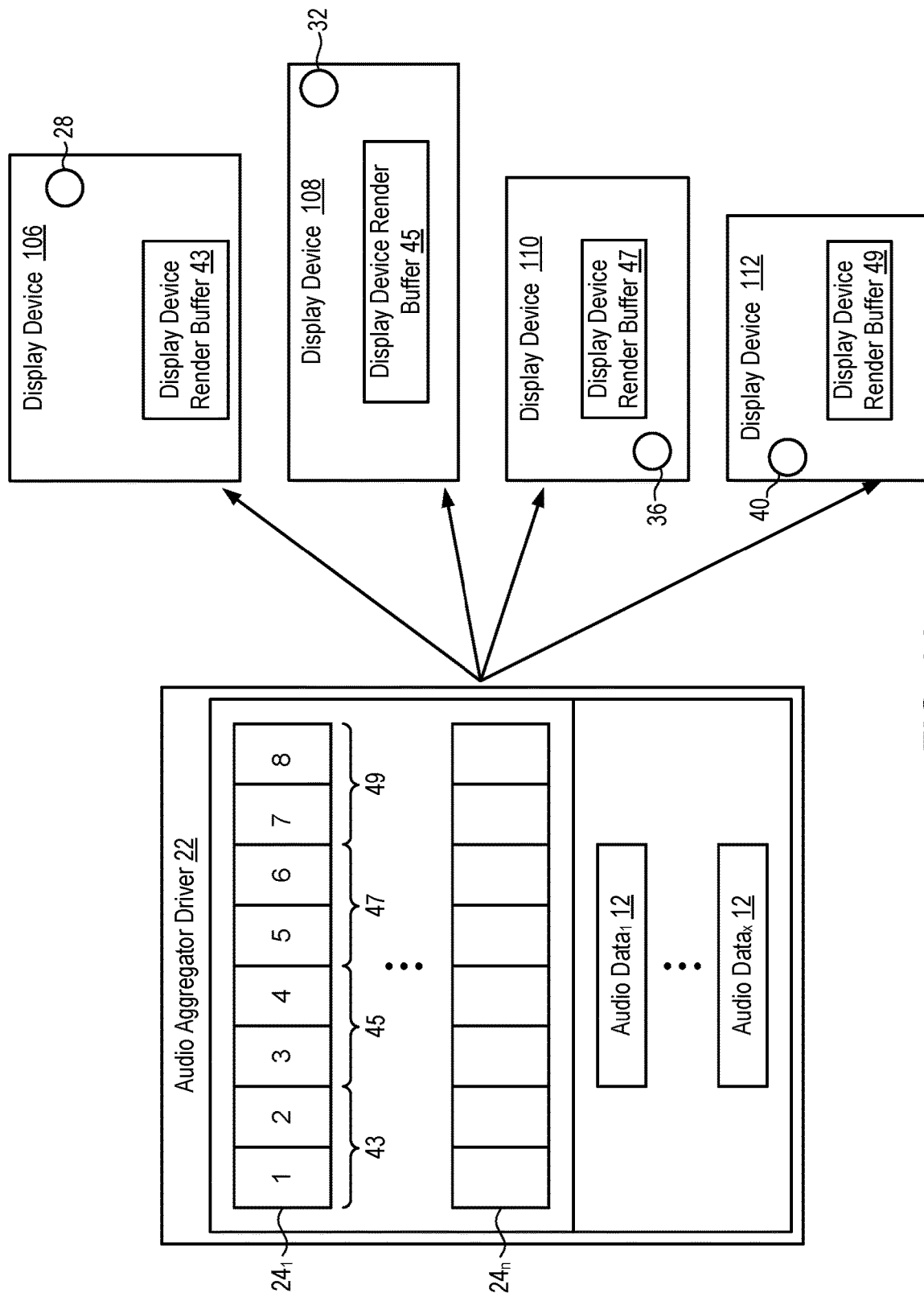
FIG. 2A is an example of identifying sections of an audio buffer that correspond to display device render buffers of each of the plurality of display devices in accordance with an implementation of the present disclosure.

Referring now to FIG. 2A, an example of partitioning audio buffer 24 into a number of sections and identifying sections of the audio buffer 24 that correspond to the display device render buffers 43, 45, 47, 49 of display devices 106, 108, 110, 112 is illustrated. Each display device 106, 108, 110, 112 may have a corresponding display device render buffer 43, 45, 47, 49 that may receive audio data 12 (FIG. 1) to output via speakers 28, 32, 36, 40. For example, display device 106 may have display device render buffer 43; display device 108 may have display device render buffer 45; display device 110 may have display device render buffer 47; and display device 112 may have display device render buffer 49.

Audio aggregator driver 22 may partition audio buffer 24 into a number of sections corresponding to the size 23 (e.g., the total number of audio channels 20 supported) of audio buffer 24. For example, when the size 23 of audio buffer 24 is equal to eight, audio buffer 24 may be partitioned into eight different sections. Each section of the audio buffer 24 may correspond to a particular speaker 28, 32, 36, 40 on display devices 106, 108, 110, 112. Audio aggregator driver 22 may identify subsections of the number of sections of audio buffer 24 that correspond to the various display devices 106, 108, 110, 112. The subsections for each display device 106, 108, 110, 112 may be determined in response to a number of channels supported by each display device 106, 108, 110, 112.

For example, display device 106 may support two channels (e.g., speaker 28 that supports two channels, right and left) and audio aggregator driver 22 may identify the first two sections of audio buffer 24 (e.g., sections 1 and 2) for display device 106. As such, the first two sections of audio buffer 24 (e.g., section 1 and section 2) may be transmitted to display device render buffer 43. Display device 108 may support two channels (e.g., speaker 32 that supports two channels, right and left) and audio aggregator driver 22 may identify the next two sections of audio buffer 24 (e.g., sections 3 and 4) for display device 108. As such, the third and fourth sections of audio buffer 24 (e.g., section 3 and section 4) may be transmitted to display device render buffer 45.

Display device 110 may support two channels (e.g., speaker 36 that supports two channels, right and left) and audio aggregator driver 22 may identify the next two sections of audio buffer 24 (e.g., sections 5 and 6) for display device 110. As such, the fifth and sixth sections of audio buffer 24 (e.g., section 5 and section 6) may be transmitted to display device render buffer 47. Display device 112 may support two channels (e.g., speaker 40 that supports two channels, right and left) and audio aggregator driver 22 may identify the remaining two sections of audio buffer 24 (e.g., sections 7 and 8) for display device 112. As such, the seventh and eighth sections of audio buffer 24 (e.g., section 7 and section 8) may be transmitted to display device render buffer 49.

By interleaving the audio data 12 together, as audio data 12 is received from application(s) 10, application(s) 10 may only be aware of a single audio endpoint that supports a number of channels. As such, application(s) 10 may provide audio data 12 that corresponds to two channels of data and audio aggregator driver 22 may internally duplicate the audio data 12 into the eight sections of audio buffer 24. The audio data 12 may also be silenced during the duplication process in response to a determination that one or more display devices 106, 108, 110, 112 may not need to output audio. Audio aggregator driver 22 may distribute the audio data 12 to each of the display devices 106, 108, 110, 112 using audio buffer 24 to emit from speakers 28, 32, 36, 40.

Figure 2B:
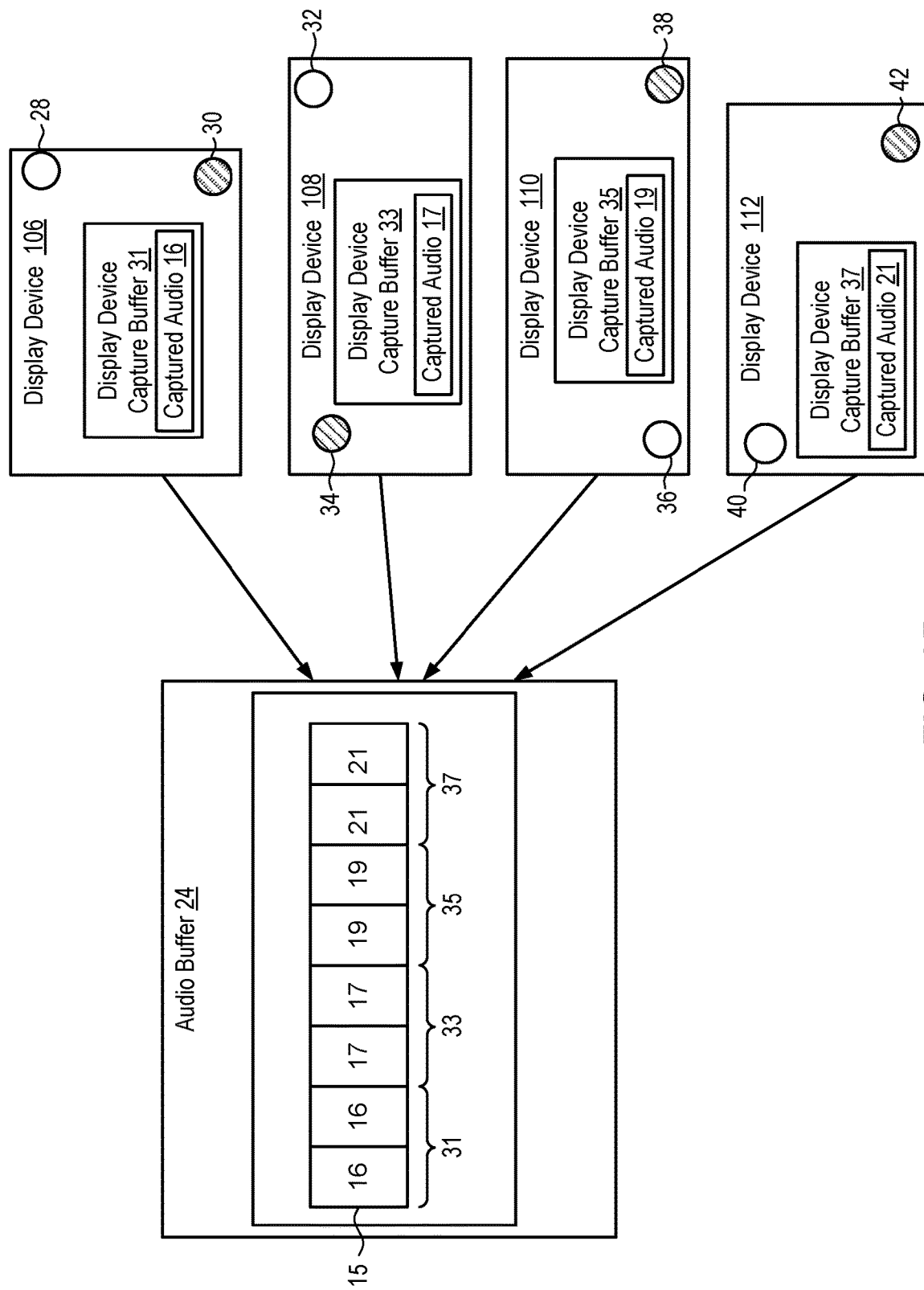
FIG. 2B is an example of identifying sections of an audio buffer that correspond to display device capture buffers of each of the plurality of display devices in accordance with an implementation of the present disclosure.

Referring now to FIG. 2B, illustrated is an example of partitioning audio buffer 24 into a number of sections and identifying sections of the audio buffer 24 that correspond to the display device capture buffers 31, 33, 35, 37 of display devices 106, 108, 110, 112. As discussed above in regards to FIG. 2A, audio buffer 24 may be partitioned into a number of sections corresponding to the buffer size 23. A subset of the number of sections allocated to a specific display device capture buffer 31, 33, 35, 37 may be in response to the total number of channels supported 20 by display devices 106, 108, 110, 112. For example, each display device capture buffer 31, 33, 35, 37 may receive a subset of two sections in the audio buffer 24 because display devices 106, 108, 110, 112 support two channels.

A device sequencing 25 may be applied to the number of sections so that each section may correspond to a specific display device capture buffer 31, 33, 35, 37. The device sequencing 25 may have an arrangement (or relative position) based on a value of an order in which display devices 106, 108, 110, 112 are connected and/or in communication with computer device 102. For example, display device 106 may be a first display device and the first two sections of audio buffer 24 may be allocated to display device capture buffer 31. The captured audio 16 from display device 106 may be stored in the first two sections of audio buffer 24.

Display device 108 may be the second display device and the next two sections of audio buffer 24 may correspond to display device capture buffer 31. The captured audio 16 from display device 108 may be stored in the next two sections of audio buffer 24. Display device 110 may be the third display device and the following two sections of audio buffer 24 may be associated with display device capture buffer 35. The captured audio 19 from display device 110 may be stored in the following two sections of audio buffer 24.

Display device 112 may be the fourth display device and the last two sections of audio buffer 24 may correspond to display device capture buffer 37. As such, the captured audio 21 from display device 112 may be stored in the last two sections of audio buffer 24.

The captured audio 16, 17, 19, 21 may be combined together using the device sequencing 25 and may result in aggregated captured audio data 15. Audio buffer 24 may include aggregated captured audio data 15 corresponding to different time/sequences of when audio may be output from display devices 106, 108, 110, 112. Audio buffer 24 may include an array of aggregated captured audio data 15 (at each time/sequence).

In addition, the aggregated captured audio data 15 may include silence (e.g., "0") in response to a display device 106, 108, 110, 112 not capturing audio 16, 17, 19, 21. For example, if music is playing nearby display devices 106, 108 and is captured by microphones 30, 34, the captured audio 16, 17 may include the captured music. The music may not be captured by microphones 38, 42 of display devices 110, 112, and the captured audio 19, 21 for display devices 110, 112 may include silence. As such, the aggregated captured audio data 15 may include the captured audio 16, 17 for the music from display devices 106, 108 and silence in the captured audio 19, 21 from display devices 110, 112.

The aggregated captured audio data 15 may be provided to applications 10. By interleaving the captured audio 16, 17, 19, 21 together, applications 10 may only be aware of a single audio endpoint that provided the aggregated captured audio data 15.

Figure 3:
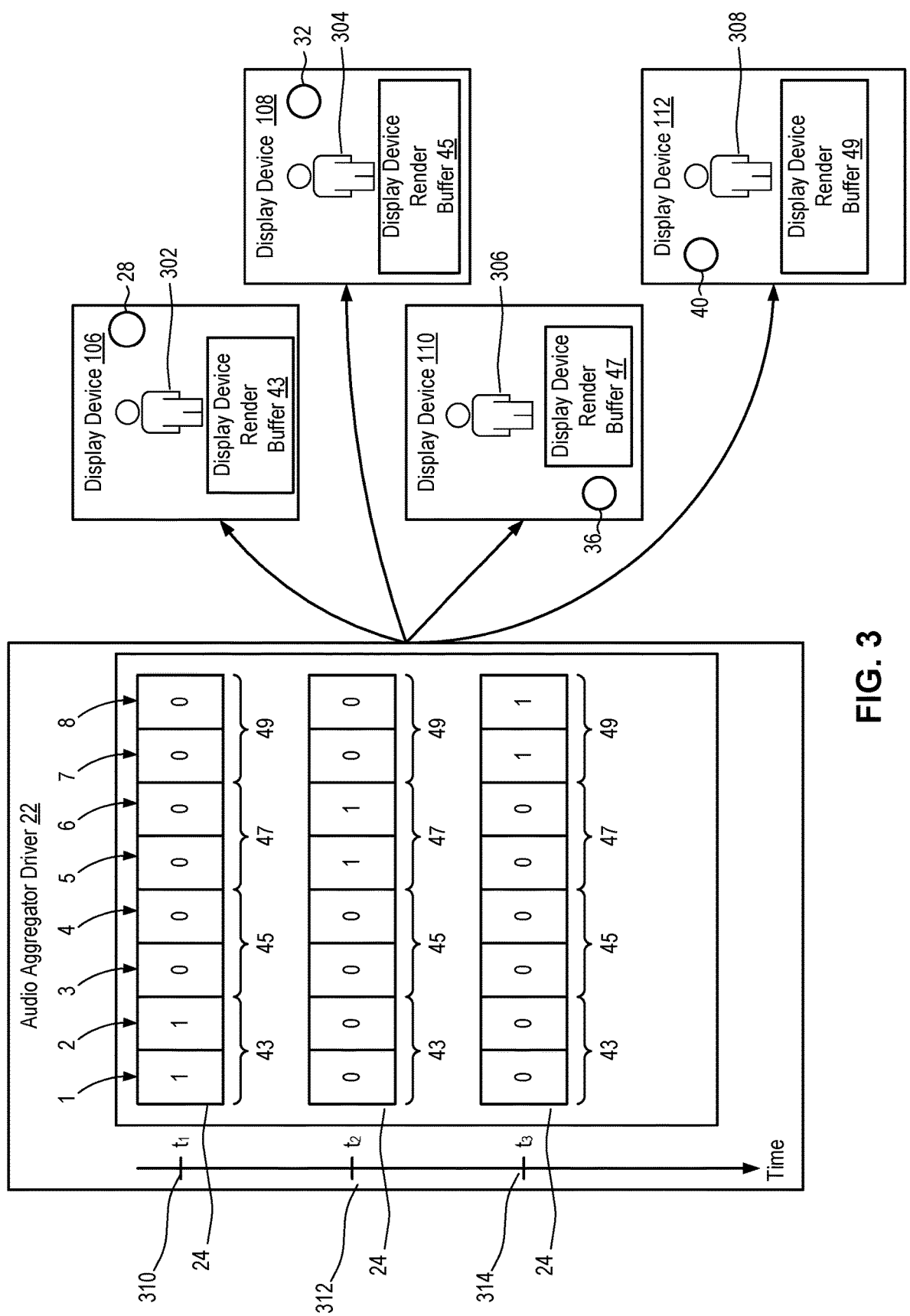
FIG. 3 is an example of a video conference using a plurality of display devices in communication with a computer device in accordance with an implementation of the present disclosure.

Referring now to FIG. 3, illustrated is an example of a video conference where the audio from the display devices 106, 108, 110, 112 in communication with computer device 102 may be combined together into a single audio buffer 24. Each of the plurality of display devices 106, 108, 110, 112 may have one or more individuals 302, 304, 306, 308 displayed. For example, the plurality of display devices 106, 108, 110, 112 may be located within a room along with one or more individuals physically located in the room speaking with individuals 302, 304, 306, 308.

Audio aggregator driver 22 may include audio buffers 24 corresponding to different time/sequences 310, 312, 314 of a video conference. Audio buffers 24 may include an array of eight sections of audio data 12 (at each time/sequence). For example, at 310 (corresponding to time ($t_1$) or to a portion of the video conference), an individual 302 may be speaking from display device 106. Audio (e.g., "1") may be included in audio data 12 at section 1 and section 2 of audio buffer 24 in response to individual 302 speaking in the video conference. Section 3 through section 8 of audio buffer 24 may include silence (e.g., "0") in the audio data 12 in response to individuals 304, 306, 308 not speaking at time ($t_1$) 310. Section 1 and section 2 of audio buffer 24 may be transmitted to display device render buffer 43 of display device 106 so that speaker 28 of display device 106 may output sound in response to individual 302 speaking at time ($t_1$) 310.

As such, at time ($t_1$) 310, section 3 and section 4 of audio buffer 24 may be transmitted to display device render buffer 45 of display device 108. Speaker 32 of display device 108 may not output sound in response to the silence in the audio data 12 at section 3 and section 4 of audio buffer 24. Section 5 and section 6 of audio buffer 24 may be transmitted to display device render buffer 47 of display device 110. Speaker 36 of display device 108 may not output sound in response to the silence in the audio data 12 at section 5 and section 6 of audio buffer 24. Section 7 and section 8 of audio buffer 24 may be transmitted to display device render buffer 49 of display device 112. Speaker 40 of display device 112 may not output sound in response to the silence in the audio data 12 at section 7 and section 8 of audio buffer 24.

At 312 (corresponding to time ($t_2$) or to a different portion of the video conference), an individual 306 may be speaking from display device 110. Audio (e.g., "1") may be included in audio data 12 at section 5 and section 6 of audio buffer 24 in response to individual 306 speaking in the video conference, while sections 1, 2, 3, 4, 7, and 8 of audio buffer 24 may include silence (e.g., 0) in audio data 12 in response to individuals 302, 304, 308 not speaking at time ($t_2$) 312 of the video conference. Section 1 and section 2 of audio buffer 24 may be transmitted to display device render buffer 43 of display device 106. Speaker 28 of display device 106 may not output sound in response to the silence in the audio data 12 at section 1 and section 2 of audio buffer 24.

Thus, at time ($t_2$) 312, section 3 and section 4 of audio buffer 24 may be transmitted to display device render buffer 45 of display device 108. Speaker 32 of display device 108 may not output sound in response to silence in the audio data 12 at section 3 and section 4 of audio buffer 24. Section 5 and section 6 of audio buffer 24 may be transmitted to display device render buffer 47 of display device 110 so that speaker 36 of display device 110 may output sound in response to individual 306 speaking at time ($t_2$) 312. Section 7 and section 8 of audio buffer 24 may be transmitted to display device render buffer 49 of display device 112. Speaker 40 of display device 112 may not output sound in response to the silence in the audio data 12 at section 7 and section 8 of audio buffer 24.

At 314 (corresponding to time ($t_3$) or to a different portion of the video conference), an individual 308 may be speaking from display device 112. Audio (e.g., "1") may be included in audio data 12 at section 7 and section 8 of audio buffer 24 in response to individual 308 speaking in the video conference, while section 1 through section 6 of audio buffer 24 may include silence (e.g., "0") in the audio data 12 in response to individuals 302, 304, 306 not speaking at time ($t_3$) 314 of the video conference. Section 1 and section 2 of audio buffer 24 may be transmitted to display device render buffer 43 of display device 106. Sound may not be emitted from speaker 28 of display device 106 in response to the silence in the audio data 12 at section 1 and section 2 of audio buffer 24.

As such, at time ($t_3$) 314, section 3 and section 4 of audio buffer 24 may be transmitted to display device render buffer 45 of display device 108. Sound may not be emitted from speaker 32 of display device 108 in response to the silence in the audio data 12 at section 3 and section 4 of audio buffer 24. Section 5 and section 6 of audio buffer 24 may be transmitted to display device render buffer 47 of display device 110. Sound may not be emitted from speaker 36 of display device 110 in response to the silence in the audio data 12 at section 5 and section 6 of audio buffer 24. Section 7 and section 8 of audio buffer 24 may be transmitted to display device render buffer 49 of display device 112 so that sound may be emitted from speaker 40 of display device 112 in response to individual 308 speaking at time ($t_3$) 314.

By having audio only output from the display device 106, 108, 110, 112 where the person is speaking, individuals physically located in the room may have a more personal experience and may interact with the person as if the person was physically sitting in the room.

Figure 4:
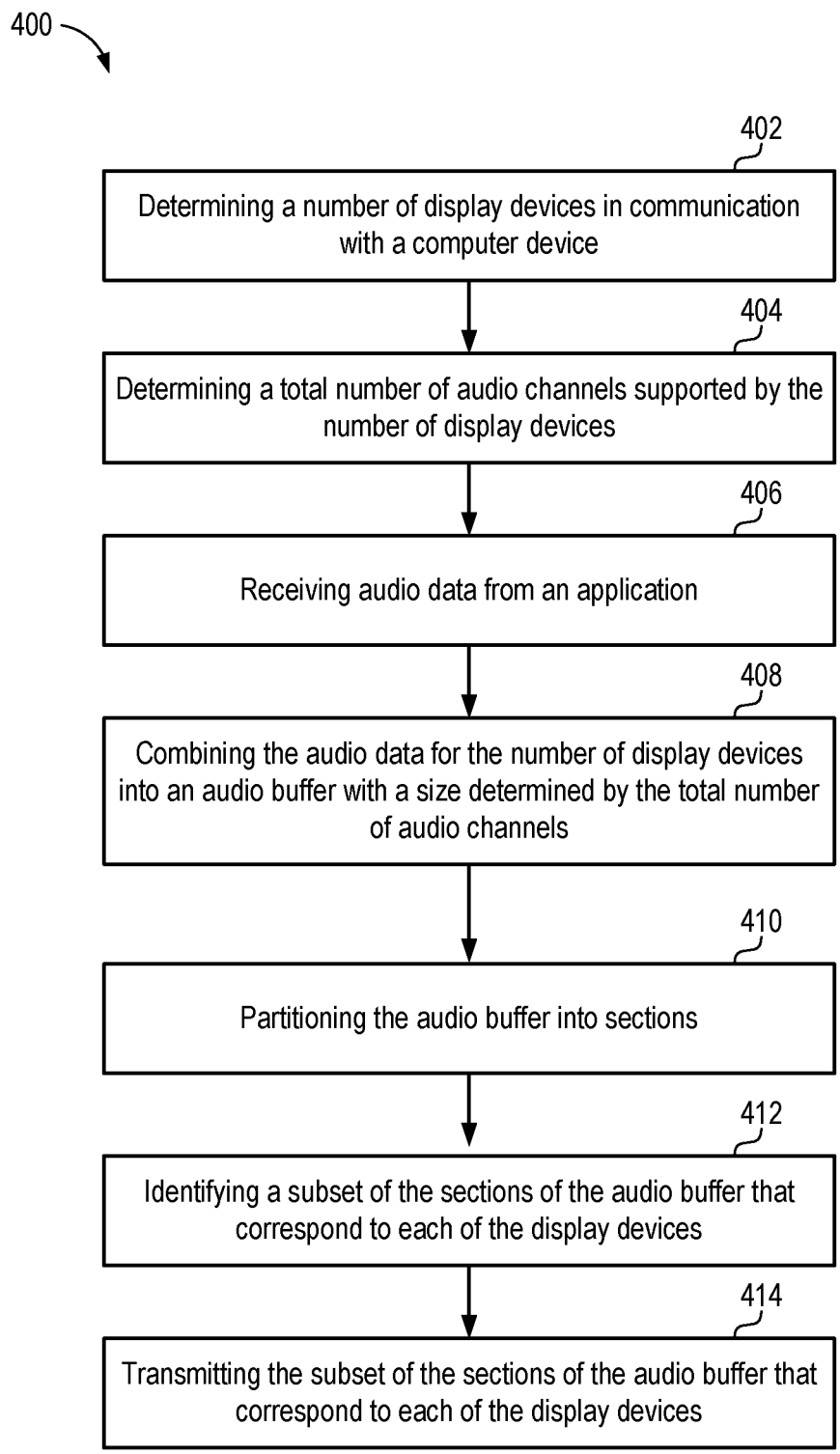
FIG. 4 is an example of a method for aggregating a plurality of display devices in communication with a computer device and representing the display devices as a single audio endpoint in accordance with an implementation of the present disclosure.

Referring now to FIG. 4, an example method 400 may be used by computer device 102 (FIG. 1) for aggregating a plurality of display devices 106, 108, 110, 112 (FIG. 1) in communication with computer device 102 and representing the display devices 106, 108, 110, 112 as a single audio endpoint. The actions of method 400 may be discussed below with reference to the architecture of FIG. 1.

At 402, method 400 may include determining a number of display devices in communication with a computer device. In an implementation, the plurality of display devices 106, 108, 110, 112 may communicate with computer device 102 via USB. The plurality of display devices 106, 108, 110, 112 may be any type of display, monitor, visual presentation device, computer device, and/or physical panel capable of presenting information, capturing audio, and/or emitting audio. In addition, each display device 106, 108, 110, 112, may include any number of channels for capturing audio and/or emitting audio.

For example, a setup component 14 may determine a total number of display devices 18 in communication with computer device 102. The total number of display devices 18 may be predetermined by a user of computer device 102 and/or user input may be received indicating the total number of display devices 18 for system 100. As display devices are added and/or removed from system 100, the total number of display devices 18 may increase and/or decrease as necessary.

The setup component 14 may also determine a device sequencing 25 that may apply an order to the display devices 106, 108, 110, 112 so that audio may be routed in response to the device sequencing 25. For example, the order may include display device 106 as a first display device, display device 108 as a second display device, display device 110 as a third display device, and display device 112 as a fourth display device.

At 404, method 400 may include determining a total number of audio channels supported by the number of display devices. Setup component 14 may also determine a total number of audio channels 20 in system 100. Each display device 106, 108, 110, 112 may provide information regarding the number of audio channels supported, such as, speakers and/or microphones. For example, setup component 14 may receive hardware information from each of the display devices 106, 108, 110, 112 that identifies how many channels display devices 106, 108, 110, 112 may have, how many channels display devices 106, 108, 110, 112 may support, whether display devices 106, 108, 110, 112 may be a high speed device or super speed device, how many audio rendering endpoints display devices 106, 108, 110, 112 may have, how many capture endpoints display devices 106, 108, 110, 112 may have, and/or any hardware loopback points on display devices 106, 108, 110, 112. Setup component 14 may capture the hardware information of the display devices 106, 108, 110, 112 and may build a topology for system 100 in response to the information learned from the display devices 106, 108, 110, 112. The total number of audio channels 20 may be calculated by adding the number of audio channels supported by each of the display devices 106, 108, 110, 112. For example, each speaker and/or microphone of display devices 106, 108, 110, 112 may correspond to any number of channels.

At 406, method 400 may include receiving audio data from an application. Audio aggregator driver 22 may receive audio data 12 from one or more applications 10. Display devices 106, 108, 110, 112 may be represented to application 10 as a single audio endpoint. As such, application 10 may be unaware of the plurality of display devices 106, 108, 110, 112 in communication with computer device 102. Application 10 may provide audio data 12 that corresponds to two channels of data.

At 408, method 400 may include combining the audio data for the number of display devices into an audio buffer with a size determined by the total number of audio channels. Audio aggregator driver 22 may generate a single audio buffer 24 for the audio data 12 for display devices 106, 108, 110, 112. The audio buffer 24 may have a size 23 that corresponds to the total number of audio channels 20 supported by system 100. As such, audio buffer 24 may be dynamic based on the parameters of system 100. As the number of display devices 106, 108, 110, 112 increases and/or decreases and/or the total number of audio channels 20 increases and/or decreases, the size 23 of audio buffer 24 may increase and/or decrease. Audio aggregator driver 22 may internally duplicate the audio data 12 into the total number of audio channels supported 20 by display devices 106, 108, 110, 112 (e.g., eight channels). The audio data 12 may also be silenced during the duplication process in response to a determination that one or more display devices 106, 108, 110, 112 may not need to output audio.

At 410 method 400 may include partitioning the audio buffer into sections. Audio aggregator driver 22 may partition audio buffer 24 into a number of sections corresponding to the size 23 of audio buffer 24. For example, when the size 23 (e.g., the total number of audio channels 20 supported) of audio buffer 24 is equal to eight, audio buffer 24 may be partitioned into eight different sections. Each section of the audio buffer 24 may correspond to a particular channel on display devices 106, 108, 110, 112 (e.g., speaker 28, 32, 36, 40).

At 412, method 400 may include identifying a subset of the sections of the audio buffer that correspond to each of the display devices. Audio aggregator driver 22 may also identify a subset of the sections of audio buffer 24 that corresponds to each display device 106, 108, 110, 112 so that audio data 12 from audio buffer 24 may distributed to the corresponding display device render buffers 43, 45, 47, 49. The subset of the sections may correspond to the number of channels supported by display devices 106, 108, 110, 112.

For example, display device 106 may support two channels (e.g., speaker 28 that supports two channels, right and left) and audio aggregator driver 22 may identify the first two sections of audio buffer 24 (e.g., sections 1 and 2) for display device 106. Display device 108 may support two channels (e.g., speaker 32 that supports two channels, right and left) and audio aggregator driver 22 may identify the next two sections of audio buffer 24 (e.g., sections 3 and 4) for display device 108. Display device 110 may support two channels (e.g., speaker 36 that supports two channels, right and left) and audio aggregator driver 22 may identify the next two sections of audio buffer 24 (e.g., sections 5 and 6) for display device 110. Display device 112 may support two channels (e.g., speaker 40 that supports two channels, right and left) and audio aggregator driver 22 may identify the remaining two sections of audio buffer 24 (e.g., sections 7 and 8) for display device 112.

By interleaving all the channels together into a single audio buffer 24, the plurality of display devices 106, 108, 110, 112 may be represented as a single audio endpoint and may be configured together without having to expose each display device 106, 108, 110, 112 individually to applications 10 and/or users of computer device 102.

At 414, method 400 may include transmitting the subset of the sections of the audio buffer that correspond to each of the display devices. Audio aggregator driver 22 may send audio data 12 from the subsets of the sections of the audio buffer 24 that correspond to each of the display devices 106, 108, 110, 112. For example, audio aggregator driver 22 may send audio data 12 from the subset of the sections of the audio buffer to the corresponding display device render buffers 43, 45, 47, 49.

Audio aggregator driver 22 may also send audio controls 26 to display devices 106, 108, 110, 112. Audio controls 26 may include, but are not limited to, volume controls. For example, a user may raise or lower the volume on all of the display devices 106, 108, 110, 112 at a single time. Audio aggregator driver 22 may receive a notification that the volume has changed and audio aggregator driver 22 may send audio controls 26 to display devices 106, 108, 110, 112 to modify the volume.

Optionally, method 400 may further include receiving any captured audio from display device capture buffers on each of the display devices and combining the captured audio into aggregated captured audio data. The captured audio 16, 17, 19, 21 may include the audio from microphones 30, 34, 38, 42 (e.g., an individual speaking) and/or any audio from speakers 28, 32, 36, 40 (e.g., background music). For example, when an individual (who may be in the same room as display devices 106, 108, 110 112) speaks near one or more of microphones 30, 34, 38, 42, the captured audio 16, 17, 19, 21 from microphones 30, 34, 38, 42 may be stored in one or more display device capture buffers 31, 33, 35, 37.

Audio aggregator driver 22 may receive the captured audio 16, 17, 19, 21 and may combine the captured audio 16, 17, 19, 21 together into audio buffer 24 to create aggregated captured audio data 15. As discussed above, audio aggregator driver 22 may determine subsections of audio buffer 24 that correspond to each display device 106, 108, 110, 112. Audio aggregator driver 22 may combine the captured audio 16, 17, 19, 21 into the subsections of audio buffer 24 that correspond to each display device 106, 108, 110, 112 using the device sequencing 25.

Optionally, method 400 may further include providing the aggregated captured audio data to one or more applications. Audio aggregator driver 22 may provide the aggregated captured audio data 15 to applications 10. For example, applications 10 may use the aggregated captured audio data 15 to record the audio output from speakers 28, 32, 36, 40 and/or received by microphones 30, 34, 38, 42.

As such, method 400 may allow audio aggregator driver 22 to aggregate all of the display devices 106, 108, 110, 112 into a single audio endpoint so that the plurality of display devices 106, 108, 110, 112 may be represented as a single audio endpoint and may be configured together without having to expose each display device individually to applications and/or users.

Figure 5:
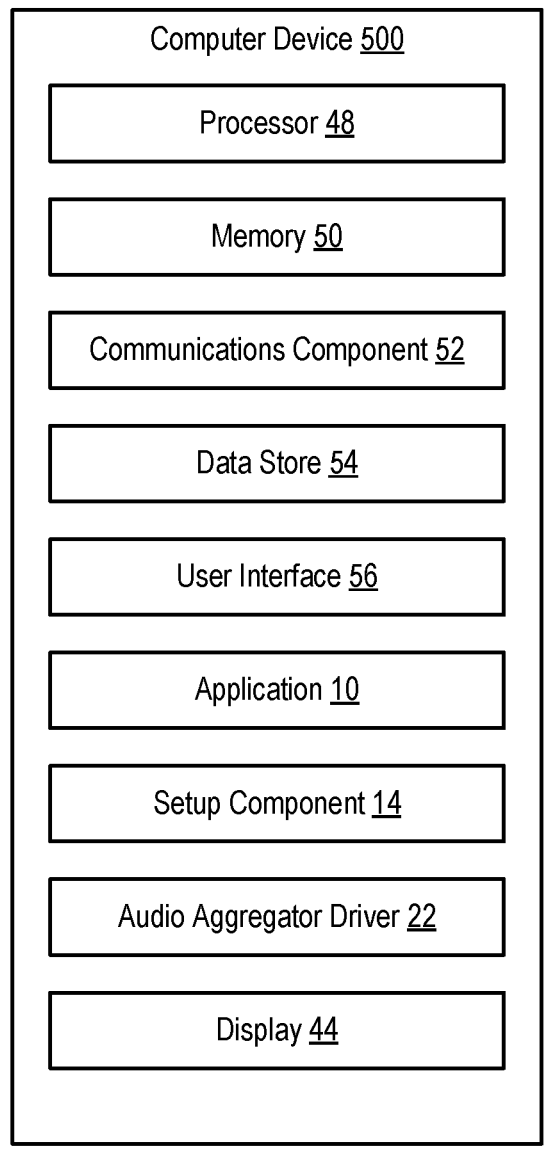
FIG. 5 is a schematic block diagram of an example device in accordance with an implementation of the present disclosure.

Referring now to FIG. 5 an example computer 500 that may be configured as computer device 102 in accordance with an implementation includes additional component details as compared to FIG. 1. In one example, computer 500 may include processor 48 for carrying out processing functions associated with one or more of components and functions described herein. Processor 48 can include a single or multiple set of processors or multi-core processors. Moreover, processor 48 can be implemented as an integrated processing system and/or a distributed processing system.

Computer 500 may further include memory 50, such as for storing local versions of applications being executed by processor 48. Memory 50 can include a type of memory usable by a computer, such as random access memory (RAM), read only memory (ROM), tapes, magnetic discs, optical discs, volatile memory, non-volatile memory, and any combination thereof. Additionally, processor 48 may include and execute operating system 111 (FIG. 1).

Further, computer 500 may include a communications component 52 that provides for establishing and maintaining communications with one or more parties utilizing hardware, software, and services as described herein. Communications component 52 may carry communications between components on computer device 102, as well as between computer device 102 and external devices, such as devices located across a communications network and/or devices serially or locally connected to computer device 102. For example, communications component 52 may include one or more buses, and may further include transmit chain components and receive chain components associated with a transmitter and receiver, respectively, operable for interfacing with external devices.

Additionally, computer 500 may include a data store 54, which can be any suitable combination of hardware and/or software, that provides for mass storage of information, databases, and programs employed in connection with implementations described herein. For example, data store 54 may be a data repository for applications 10, setup component 14, audio aggregator driver 22, and/or display 44.

Computer 500 may also include a user interface component 56 operable to receive inputs from a user of computer device 102 and further operable to generate outputs for presentation to the user. User interface component 56 may include one or more input devices, including but not limited to a keyboard, a number pad, a mouse, display 44 (e.g., which may be a touch-sensitive display), a navigation key, a function key, a microphone, a voice recognition component, any other mechanism capable of receiving an input from a user, or any combination thereof. Further, user interface component 56 may include one or more output devices, including but not limited to a display, a speaker, a haptic feedback mechanism, a printer, any other mechanism capable of presenting an output to a user, or any combination thereof.

In an implementation, user interface component 56 may transmit and/or receive messages corresponding to the operation of applications 10, setup component 14, audio aggregator driver 22, and/or display 44. In addition, processor 48 executes applications 10, setup component 14, audio aggregator driver 22, and/or display 44, and memory 50 or data store 54 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A computer device, comprising:
    a memory to store data and instructions;
    at least one processor configured to communicate with the memory; and
    an operating system configured to communicate with the memory and the at least one processor, wherein the operating system is operable to:
        receive audio data from an application;
        combine the audio data for a plurality of display devices in communication with the computer device into an audio buffer with a size determined by a total number of audio channels of the plurality of display devices;
        partition the audio buffer into sections, wherein a total number of the sections correspond to the size of the audio buffer;
        identify a subset of the sections of the audio buffer that correspond to each of the plurality of display devices; and
        transmit the subset of the sections of the audio buffer that correspond to each of the plurality of display devices.

2. The computer device of claim 1, wherein the operating system is further operable to determine the total number of audio channels by adding a number of audio channels supported by each of the plurality of display devices together, and
    wherein the subset of the sections corresponds to the number of audio channels supported by each of the plurality of display devices.

3. The computer device of claim 1, wherein the operating system is further operable to combine the audio data for the plurality of display devices into the subset of the sections of the audio buffer using a device sequencing.

4. The computer device of claim 3, wherein the operating system is further operable to transmit the subset of the sections of the audio buffer using the device sequencing.

5. The computer device of claim 1, wherein the operating system is further operable to dynamically change the size of the audio buffer when at least one of a number of the plurality of display devices increases or decreases or a number of audio channels supported by each of the plurality of display devices increases or decreases.

6. The computer device of claim 1, wherein each of the plurality of display devices includes a display device render buffer.

7. The computer device of claim 6, wherein the operating system is further operable to transmit the subset of the sections of the audio buffer to the display device render buffer for each of the plurality of display devices.

8. The computer device of claim 1, wherein the plurality of display devices are in communication with the computer device via a universal serial bus (USB).

9. The computer device of claim 1, wherein the audio data received includes two channels of data, and
   wherein the operating system is further operable to duplicate the two channels of data into the total number of audio channels.

10. A method for aggregating a plurality of display devices in communication with a computer device, comprising:
   receiving, at an operating system executing on the computer device, audio data from an application;
   combining the audio data for the plurality of display devices in communication with the computer device into an audio buffer with a size determined by a total number of audio channels of the plurality of display devices;
   partitioning the audio buffer into sections, wherein a total number of the sections correspond to the size of the audio buffer;
   identifying a subset of the sections of the audio buffer that correspond to each of the plurality of display devices; and
   transmitting the subset of the sections of the audio buffer that correspond to each of the plurality of display devices.

11. The method of claim 10, wherein the method further comprises:
   determining the total number of audio channels by adding a number of audio channels supported by each of the plurality of display devices together, and
   wherein the subset of the sections corresponds to the number of audio channels supported by each of the plurality of display devices.

12. The method of claim 10, wherein combining the audio data for the plurality of display devices into the subset of the sections of the audio buffer uses a device sequencing.

13. The method of claim 12, wherein transmitting the subset of the sections of the audio buffer uses the device sequencing.

14. The method of claim 10, wherein the method further comprises:
   dynamically changing the size of the audio buffer when at least one of a number of the plurality of display devices increases or decreases or a number of audio channels supported by each of the plurality of display devices increases or decreases.

15. The method of claim 10, wherein each of the plurality of display devices includes a display device render buffer.

16. The method of claim 15, wherein the method further comprises:
   transmitting the subset of the sections of the audio buffer to the display device render buffer for each of the plurality of display devices.

17. The method of claim 10, wherein the plurality of display devices are in communication with the computer device via a universal serial bus (USB).

18. The method of claim 10, wherein the audio data received includes two channels of data, and
   wherein the method further comprises:
   duplicating the two channels of data into the total number of audio channels.

19. The method of claim 10, wherein the method further comprises:
   receiving a volume control for the plurality of display devices; and
   transmitting the volume control to each of the plurality of display devices.

20. A non-transitory computer-readable medium storing instructions executable by a computer device, comprising: at least one instruction for causing the computer device to receive audio data from an application; at least one instruction for causing the computer device to combine the audio data for a plurality of display devices in communication with the computer device into an audio buffer with a size determined by a total number of audio channels of the plurality of display devices; at least one instruction for causing the computer device to partition the audio buffer into sections, wherein a total number of the sections correspond to the size of the audio buffer; at least one instruction for causing the computer device to identify a subset of the sections of the audio buffer that correspond to each of the plurality of display devices; and at least one instruction for causing the computer device to transmit the subset of the sections of the audio buffer that correspond to each of the plurality of display devices.

* * * * *